US007103632B2

(12) United States Patent
Soussin et al.

(10) Patent No.: US 7,103,632 B2
(45) Date of Patent: Sep. 5, 2006

(54) METHOD OF TRANSMITTING MESSAGES BETWEEN TWO COMPUTERS CONNECTED TO A NETWORK AND CORRESPONDING MESSAGING SYSTEM

(75) Inventors: Frédéric Soussin, Saint-Baldoph (FR); Bruno Jauneaud, Paris (FR)

(73) Assignee: Kanari World, Paris (FR)

( * ) Notice: Subject to any disclaimer, the term of this patent is extended or adjusted under 35 U.S.C. 154(b) by 722 days.

(21) Appl. No.: 10/048,610

(22) PCT Filed: Jun. 1, 2001

(86) PCT No.: PCT/FR01/01704

§ 371 (c)(1),
(2), (4) Date: Feb. 4, 2002

(87) PCT Pub. No.: WO01/95577

PCT Pub. Date: Dec. 13, 2001

(65) Prior Publication Data

US 2002/0107929 A1 Aug. 8, 2002

(30) Foreign Application Priority Data

Jun. 5, 2000 (FR) .................................. 00 07138

(51) Int. Cl.
*G06F 15/16* (2006.01)
(52) U.S. Cl. ...................................... 709/205
(58) Field of Classification Search ............... 709/205, 709/203, 208, 211, 216, 246; 370/546; 707/1, 707/9; 715/505, 507, 530, 1, 9
See application file for complete search history.

(56) References Cited

U.S. PATENT DOCUMENTS

| 5,388,196 | A | * | 2/1995 | Pajak et al. | 715/751 |
| 5,479,514 | A | * | 12/1995 | Klonowski | 380/47 |
| 6,144,653 | A | * | 11/2000 | Persson et al. | 370/337 |
| 6,671,804 | B1 | * | 12/2003 | Kent | 713/175 |
| 6,788,707 | B1 | * | 9/2004 | Horton et al. | 370/474 |
| 6,839,759 | B1 | * | 1/2005 | Larson et al. | 709/228 |
| 2002/0004812 | A1 | * | 1/2002 | Motoyama | 709/201 |
| 2002/0049612 | A1 | * | 4/2002 | Jaeger et al. | 705/2 |
| 2002/0184384 | A1 | * | 12/2002 | Simmon et al. | 709/236 |
| 2004/0107356 | A1 | * | 6/2004 | Shamoon et al. | 713/193 |

FOREIGN PATENT DOCUMENTS

WO    WO92/22033    12/1992

OTHER PUBLICATIONS

Y. Sakama et al, "Agent Communications on OCN", NTT Review, JP Telecommunications Association, Tokyo, vol. 9, No. 3, May 1, 1997, pp. 40-48.

* cited by examiner

*Primary Examiner*—David Wiley
*Assistant Examiner*—Ian dai thi Truong
(74) *Attorney, Agent, or Firm*—Young & Thompson

(57) ABSTRACT

The invention provides a method of transmitting a message from a first computer (1, 2, 3) to at least one second computer (3, 2, 1), the method comprising the step in the first computer of introducing transmission information into a message header, and further comprising the step, in the first computer, of introducing into the message header at least one management instruction for managing a filing space and suitable for execution by the second computer. The invention also provides a corresponding messaging system.

22 Claims, 1 Drawing Sheet

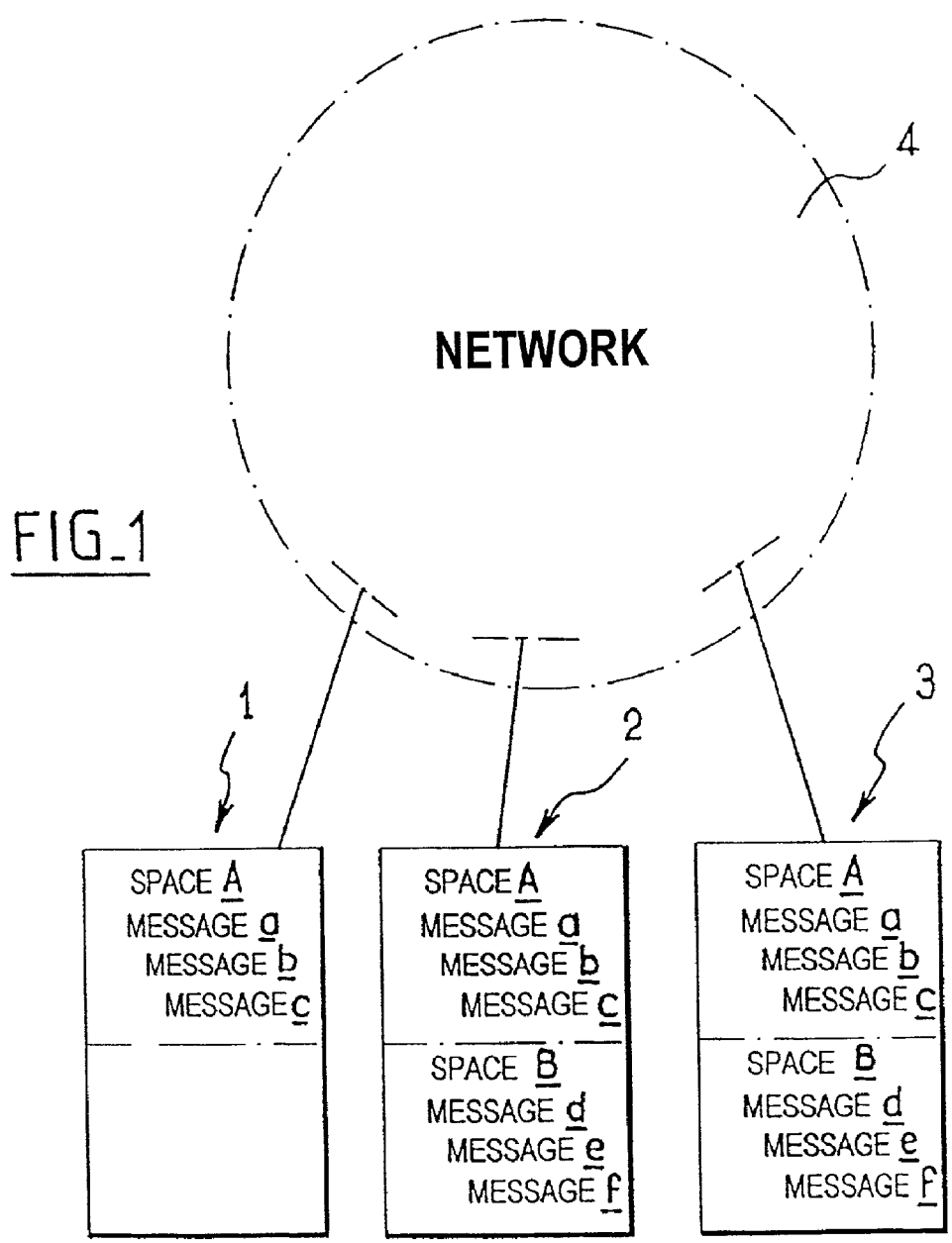
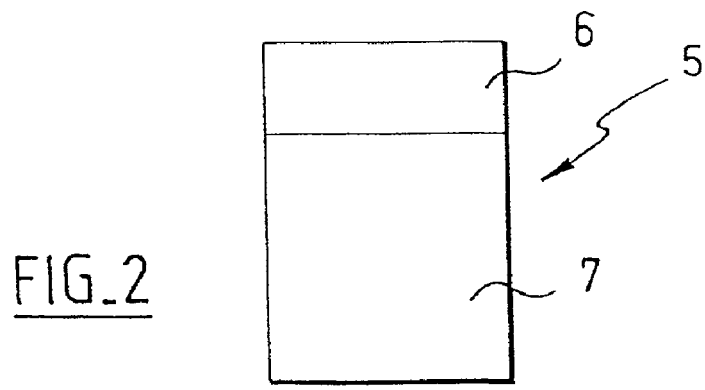

METHOD OF TRANSMITTING MESSAGES BETWEEN TWO COMPUTERS CONNECTED TO A NETWORK AND CORRESPONDING MESSAGING SYSTEM

The present invention relates to a method of transmitting a message between at least two computers interconnected by an external network such as a network of the Internet type, or an internal network such as a business network of the Intranet type. The invention also relates to a corresponding messaging system.

BACKGROUND OF THE INVENTION

Message transmission methods of known type are generally implemented using a messaging computer program implanted in memories of computers connected to the network. By means of the messaging program, the user of the sending computer creates a message comprising both a header containing transmission information such as the address of the destination computer and the subject of the message, and also a body in which the user places the text constituting the information content of the message. The message is then sent after the sending computer has automatically filled out the transmission information, for example by adding the identity of the sending computer and time-and-date stamp data. Received messages are recorded in the destination computer so as to appear in an in-box of the messaging program. Unfortunately, when the number of received messages is large, the time required by the user in order to deal with them (i.e. to read them, to file them, to delete them, to reply to them, . . . ) is relatively long. In order to automate the filing work, the user can parameterize filters in the receiving messaging program enabling different received messages to be put into particular spaces as a function, for example, of the name of the sender of the message, of its subject, . . . . Nevertheless, when a large number of received messages all deal with the same subject or all come from the same person, the time required by the user of the receiving computer to deal with received messages remains long.

Furthermore, it can be advantageous, e.g. in the context of a work group, for the various users of computers connected to a network to use the same method of filing messages on the basis of the same classification. This is possible only providing the content of the computer of each of the users is verified periodically and the received messages are reorganized where necessary, which is not conceivable under most circumstances, in particular given the large number of computers connected to the network (several hundreds to several thousands in large businesses), the geographical distances between them, and the reticence of users.

Furthermore, when a group of users of a network, such as the employees of a business or individuals connected to the Internet, seek to share information interactively by structured interchanges, they need a dedicated server and they must form a so-called "community" thereon. To do this, the user originating the community must establish a list of members of the community and rules defining how members access the server and the information it contains. Setting up such a community also requires its members to install software on their own computers in order to interpret the protocol for communication with the server, to read and write information for sending thereto, for downloading information recorded thereon, . . . . The server to which each member can make a connection using the above-mentioned software serves to administer the community by managing member access, and it centralizes the information sent by members, filing it and storing it hierarchically. The server is also required to control the facilities allowed to members for acting on the information to which they have access. Setting up such a server is expensive, particularly because of the cost of the server if it needs to be purchased, the cost of the software using the protocol specific to the server used, costs involved with managing the server, costs accrued by members of the community connecting to the server, . . . . It is also time-consuming to set up a server and it is not very interactive in use since any modification relating to the members of the community, to their modes of access, or to the facilities they have for acting on the information requires action to be taken at the server, and this must be done by qualified personnel. Thus, the use of such servers is particularly rigid, and that goes against users' desire for flexibility in interactively sharing the information contained in the server. Furthermore, when the volume of information on the server becomes too large, the oldest information is removed. This removal is performed at the discretion of the management of the server without necessarily referring to the members of the community. This reduces the overall memory of the community.

Such interchanges of messages are regularly undertaken by work groups or by discussion forums or "news groups".

OBJECTS AND SUMMARY OF THE INVENTION

An object of the invention is to propose a novel method of transmitting messages that enables interchange to be performed interactively and in structured manner.

To achieve this object, the invention provides a method of transmitting a message from a first computer to at least one second computer, the method comprising, in the first computer, the step of introducing transmission information into a header of the message, and according to the invention, the additional step of introducing into the header of the message at least one instruction that can be executed by the second computer to manage a filing space.

The term "information" is used to mean data used by a computer and it serves to occupy a field, which is either displayed or stored, for example. The information in question constitutes passive data. The term "instruction" is used to mean data that is active, an element that is used or interpreted directly in the destination computer by means of a computer program for modifying data or data organization in the destination computer. An instruction constitutes active data: an order. Thus, it is possible to cause the message header to constitute a vector for instructions which are executed automatically by the destination computer, in this case the second computer, on receiving the message, and causing said computer to perform one or more operations concerning the management of filing space in said computer, for example actions suitable for setting up or managing a community, for filing or organizing messages in hierarchical manner, for deleting or modifying messages, . . . . It is thus the sender of a message who decides on how the messages sent are to be classified in the destination computer. This method makes it possible to set up work groups or discussion forums without any need for a dedicated server.

According to a first particular characteristic, the management instruction is an instruction for creating a message filing space in the second computer, or an instruction for modifying properties of a message filing space in the second computer.

According to a second particular characteristic, the method further comprises the step of introducing in the header of the message at least one item of information for filing the message in a filing space of the second computer, and the second computer incorporates means for automatically reading said information and for filing the message in the corresponding manner within the second computer.

According to a third particular characteristic, the management instruction is an instruction for deleting a message in the second computer or an instruction for modifying a message in the second computer.

Advantageously, the method further comprises the step of introducing into the header of the message at least one item of information for ordering the message relative to a message that appears at least in the second computer, and the second computer incorporates means for reading said information automatically and for filing the message in corresponding manner in the second computer.

This makes it possible to organize messages hierarchically relative to one another, e.g. depending on whether certain messages are replies to other messages.

Preferably, the transmission method further comprises the steps of creating a filing space in the first computer, of associating it with properties, and of creating the message to be sent relating to said space, the management instruction being introduced automatically into the header of the message, and comprising an instruction for filing the message in the corresponding filing space of the second computer, or an instruction for creating the corresponding filing space in the second computer, the method further comprising the step of introducing the properties of the space into the header of the message simultaneously with introducing the management instruction.

The sender of the message and the receiver thereof thus use the same classification method, with the method being selected by the sender and being imposed on the receiver.

According to a preferred characteristic, once a filing space has been created in the second computer by a message coming from the first computer, the method further comprises the step of sending a message to the first computer having a header containing an instruction for deleting an address of the second computer in the first computer in association with the filing space.

When the receiver of a message that has caused a filing space to be created on the destination computer does not desire or no longer desires to use said space, then it suffices for the receiving user to request removal of access thereto so that no further message associated with this space can reach the receiver from the sender. Thus, when the filing space created in the first computer is associated with a list of message recipients which is to be created in said space, the instruction requesting that messages stop being sent to the second computer can be an instruction for removing the address of the second computer from the above-specified list.

According to another advantageous characteristic, the method further comprises, in the first computer and prior to transmitting the message, the steps of introducing integrity information into the header of the message and of encoding at least said integrity information using an encryption algorithm, and the method further comprises, in the second computer, the steps of decoding the integrity information, of verifying whether the integrity information is correct, and if not correct of ignoring the management instruction contained in the header of the message.

Thus, any unauthorized modification to the header between the message being sent and being received is prevented.

Preferably, the method includes the step of associating authorization to access at least one message, where such access authorization makes it possible, for example, to read and to reply to the message or is restricted to only reading the message, the method including the step of introducing access authorization in the message header or in the properties of the filing space.

This makes it possible for each message to reproduce parts of a set of rules for a community.

In a particular embodiment, the transmission method is implemented by means of a program installed in the first and second computers, the program enabling messages to be sent, messages to be received, and instructions contained in message headers to be executed automatically when messages are received.

Thus, the execution of instructions is totally transparent to the user of a computer receiving a message.

The invention also provides a messaging system comprising at least two computers which are interconnected by means of a network and each of which incorporates a messaging program for sending and receiving messages over the network, the messages including respective headers, the messaging program including means for introducing transmission information into the headers of messages to be sent, means for reading said transmission information in the headers of received messages, and means for executing at least one instruction contained in the header of a received message on receiving the message.

BRIEF DESCRIPTION OF THE DRAWING

Other characteristics and advantages of the invention will appear on reading the following description of a particular non-limiting implementation of the invention. Reference is made to the accompanying drawing, in which:

FIG. 1 is a diagrammatic representation of the architecture of a computer network implementing the method of the invention; and FIG. 2 is a diagrammatic representation of a message.

MORE DETAILED DESCRIPTION

The method of the invention is for transmitting messages between computers 1, 2, 3 connected to one another via a network 4, in this case of the Internet type. The computers 1, 2, 3 could equally well be connected to a local network such as a business network, e.g. of the Intranet type. The computers 1, 2, 3 are connected to the network 4 either directly or else via an access supplier.

In this case, each of the computers is of the personal computer (PC) type and it possesses memory containing a record of a messaging program adapted to implement the message transmission method of the invention and to operate using a messaging standard of the POP3/SMTP type. The program can also be adapted to operate using some other messaging standard, such as the IMAP4 protocol, for example. Other types of computer can be used such as workstations, terminals, servers, . . . .

The messages 5 transmitted by means of the method of the invention comprise in conventional manner a header 6 and a body 7.

In conventional manner, a message 5 generated using the messaging program of the invention contains both transmission information appearing in the header 6 and informative data constituting the message proper which appears in the body 7. The transmission information comprises at least the address of the destination computer, possibly together with the identity of the recipient, such as a user name, identification of the sending computer, the type of messaging program used by that computer, time and date information based on local time, the subject matter of the message, . . . . The informative data can be constituted in conventional manner by text and/or pictures, possibly using the so-called hypertext markup language (HTML) format.

In general, the method of the invention comprises the step at the sending computer of introducing at least one instruction into the header 6 of a message 5 for the purpose of managing a filing space, which instruction is executable by the destination computer. The computer program contained in the destination computer is arranged to interpret and execute the management instruction automatically on receiving the message. In a variant, the computer program can be arranged to request the consent of the user prior to executing the instruction.

By way of example, the transmission of messages between the computers 1, 2, and 3 is described below.

The user of computer 1 seeks to work with the users of computers 2 and 3 and to share information with them.

The user of computer 1 thus creates a filing space A (e.g. in the form of a folder or a memory zone in computer 1) and associates properties with this space to specify the list of people to whom the messages created in this space are to be sent (the list including their network identities, e.g. the addresses of their computers), access authorizations to said space, and its content. For example, the user of computer 2 might be entitled only to read the messages that are interchanged whereas the user of computer 3 can read those messages, reply to them, and delete those messages already placed in said space and which originate from said user. This prerogative is naturally also available to the user of computer 1.

The user of computer 1 then creates a message <u>a</u> in space A, which message <u>a</u> will contain not only the information that is to be shared, but also conventional transmission information and management instructions which are introduced into the header of message <u>a</u> before said message is sent.

These management instructions comprise:
 an instruction to create a filing space A in each of the computers 2 and 3, which spaces will be associated with the properties that enable them to be managed;
 an instruction for filing message <u>a</u> in the filing space A that has been created in this way; and
 information concerning integrity.

Before message <u>a</u> is sent, the integrity information is encoded using an encryption algorithm known to the messaging program, and is then formatted on 64 bits to correspond to the format of the header of the message. Thereafter the message is sent by the messaging program over the network 4 to destination computers 2 and 3.

On receiving the message, the messaging program in each destination computer decodes the integrity information by means of an internal decrypting algorithm of known type and it verifies that the integrity information is valid.

If the integrity information is correct, then the messaging program in each destination computer creates a filing space A in the corresponding computer, which space is associated with the properties defined by the user of computer 1, and it puts the message <u>a</u> into the space A that it has created in this way.

If the integrity information is not correct, the messaging program does not take account of the management instructions contained in the header and it merely displays message <u>a</u> as a conventional message, in the same manner as it would display a message sent from a conventional messaging program that does not incorporate any instructions in its messages.

The user of computer 3 can read message <u>a</u>. If that user desires to reply to message <u>a</u> by means of the message <u>b</u>, it is necessary while creating message <u>b</u> to specify that this message constitutes a reply to message <u>a</u>. The messaging program in computer 3 then introduces management instructions into the header of message <u>b</u> containing:
 an instruction to file message <u>b</u> in space A;
 an instruction to order message <u>b</u> relative to the other messages that appear in space A, this instruction specifying that message <u>b</u> is a reply to message <u>a</u>; and
 integrity information.

Message <u>b</u> is then sent in the manner described above so as to be received by computers 1 and 2. The programs contained in those computers then execute the above-specified instructions. To enable the users of the destination computers to see that message <u>b</u> is a reply to message <u>a</u>, message <u>b</u> can be displayed, for example, beneath message <u>a</u>, and set-back relative thereto.

The user of computer 1 can then reply to message <u>b</u>, or can send a message <u>c</u> having the same hierarchical level as the message <u>a</u>, as could also be done by the user of computer 3. Message <u>c</u> then appears on computers 1, 2, and 3 on the same alignment as message <u>a</u>.

If one of the users of computers 2 and 3 does not desire to maintain a space A on their own computer, e.g. because the content of the corresponding information is not of interest, it suffices for that user to instruct the messaging program to issue a message whose header contains an instruction requesting that the address of the corresponding computer be deleted from the properties associated with space A. This deletion is performed automatically when the message is received by the messaging program in the other computers. It is also possible to envisage the user sending the delete message to the original sender who created the space (as identified from the header of the message that created the space), who will in turn automatically relay (route) this deletion to the other users sharing said space, on the next occasion that the computer of the space creator is synchronized with the network.

The same applies to transmitting messages <u>d</u>, <u>e</u>, and <u>f</u> in a space B created by the user of computer 3 in computer 2.

The following management instructions can also be used.

An instruction for modifying the properties of a space makes it possible, for example, to modify the conditions of access to the messages in said space, the subject matter of said space, the name of said space, . . . .

An instruction for reorganizing a filing space can be used, for example, to modify the way in which messages are arranged in a filing space.

An instruction for deleting a filing space makes it possible for the creator of a space to delete it in the computers of the other members of the work group.

Instructions for modifying, deleting, or archiving a message can also be used.

An instruction for moving a message or a plurality of messages from one filing space to another filing space can be used to modify the classification of one or more messages.

An instruction for replacing a message enables the message whose header contains said information to take the place of a message sent previously. This can apply, for example, when the later message is a corrected version of an earlier message. Under such circumstances, time-and-date stamp data expressed in universal time is advantageously included in the message header. For this purpose, provision is made in the program of the computer to specify the time difference between local time and universal time in such a manner as to enable the messaging program to calculate the time and date at which the message is sent in terms of universal time on the basis of the time and the date of sending as based on local time. Thus, when the messaging program connects the computer to the network, the messaging program initially receives messages coming from other computers and compares the time-and-date stamp information in universal time of the received messages with that of the messages for sending that are associated therewith. When a received message is a corrected version of an earlier message and, in this respect, incorporates a reference to the prior message in its header, and when a message for sending is a reply to said prior message and itself incorporates a reference thereto, then, on reception, a comparison is performed by the messaging program between the time-and-date stamp information in universal time of the two messages, and as a result the sending of the reply message can be deferred to a time after the recipient has become aware of the correction message and has been given the chance to modify the reply.

Furthermore, other information associated with the content of the message itself, its author, its date of creation, a classification category or subcategory, a hierarchical level, a particular version of the message, a reference to a message previously sent or received, etc., can be included in the message header under determined headings enabling the messaging program to extract said information and display it or to file the message. Information indicating that it is not possible to copy, move, and/or print the content of a message can also be included in the header of the message, e.g. for the purpose of safeguarding the intellectual property rights of its author.

Finally, it is also possible to use the message header to show information constituting the entire information content of the message. The advantage of putting such information into the message header instead of into the body thereof, is that the information can be extracted automatically by the messaging program of the destination computer.

Thus, an address list can be shared by putting the corresponding data into the message header under various headings, e.g. comprising the forename of the person in question, the family name, company, position, electronic address, website address, personal address, city, state, professional and personal phone numbers, etc. The data is organized automatically in the messaging program of the destination computer.

Naturally, the messaging program includes cryptographic means enabling not only the message header to be encoded but also the body thereof. Conventional type classification filters can also be provided in the messaging program.

It should be observed that since the messaging program uses a conventional messaging standard and is compatible with the multipurpose Internet mail extension (MIME) standards referenced RFC 1521 and RFC 1522, the messages sent by means of the program can be read by conventional messaging programs, which merely ignore the processing instructions.

In a particular application of the method of the invention, a company X which has acquired rights from a company Y using a messaging program suitable for implementing the method of the invention distributes to its customers or prospects a version of the messaging program that includes a graphics interface under its own getup. Free distribution of the messaging program can form part of a publicity offer.

The messaging program used makes it possible firstly to create main filing spaces, e.g. for automatic display whenever the messaging program is run, and secondly to create secondary filing spaces which are not displayed automatically when the program is opened.

Company X has encryption parameters enabling it to encode at least instructions for creating main spaces and the messaging program delivered to the clients of company X will incorporate parameters enabling them to decode the instructions for creating main spaces.

Thus, only company X, which has the appropriate encryption parameters, can create main filing spaces in computers incorporating the messaging program it has distributed. This can prevent competing companies from creating main spaces on said computers.

Company X can thus create spaces and send messages to said spaces which might contain promotional offers, bank account statements, information about company X or its market, advertising, etc. These spaces could be "passive" in the destination computers, i.e. without giving the users of said computers the possibility of sending their own messages. They could be of the 1 to $n$ type (for information being sent from X to targeted users satisfying certain criteria) or of the 1 to 1 type (e.g. when dealing with bank statements).

Whenever one of the clients or the prospects of company X uses the messaging program, provision can be made for the messaging program to connect the computer automatically to the network in order to receive messages and in order to send automatically a message to company Y operating the messaging program. The message header would include information about the main spaces that have been created (number of spaces, e.g. in order to enable company X to be billed by company Y), on the secondary spaces that have been created (number of such spaces, creators, subject matter, . . . ), on Internet sites that have been visited, etc., so as to enable a database to be built up concerning the habits of the client.

Provision can be made for a user who is also interested in some other company, in this case a company Z, to be able to request that a corresponding main (or secondary) space be created on that user's computer, e.g. by the user making an application to the Internet site of company Z. The user is then taken to the Internet site of a company X in charge of creating main spaces in the messaging programs that have been distributed or to the Internet site of company Y that operates them, regardless of which company actually did the distribution. This makes it possible to control the creation of spaces on users' computers and to avoid them becoming clogged up.

Naturally, the invention is not limited to the embodiment described and variants can be made thereto without going beyond the ambit of the invention as defined by the claims.

The invention claimed is:

1. A method of transmitting a message (5) from a first computer (1, 2, 3) to at least one second computer (1, 2, 3), the method comprising, in the first computer, the step of introducing transmission information into a header (6) of the message, and in the first computer, the step of introducing into the header of the message at least one instruction that can be executed by the second computer to manage a filing space, wherein, once the filing space has been created in the second computer by a message coming from the first computer, the method further comprises the step of sending a message to the first computer having a header containing an instruction for deleting an address of the second computer in the first computer in association with the filing space.

2. A transmission method according to claim 1, wherein the instruction to manage the filing space is an instruction for creating the filing space in the second computer (1, 2, 3).

3. A transmission method according to claim 2, further comprising the step of introducing in the header (6) of the message (5) at least one item of information for filing the message (5) in a filing space of the second computer, and wherein the second computer incorporates means for automatically reading said information and for filing the message in the corresponding manner within the second computer.

4. A transmission method according to claim 1, further comprising the steps of creating a filing space in the first computer (1, 2, 3), of associating it with properties, and of creating the message (5) to be sent relating to said space, the instruction to manage the filing space being introduced automatically into the header (6) of the message (5).

5. A transmission method according to claim 4, wherein the instruction to manage the filing space comprises an instruction for filing the message in the corresponding filing space of the second computer.

6. A transmission method according to claim 4, wherein the instruction to manage the filing space comprises an instruction for creating the corresponding filing space in the second computer, the method further comprising the step of introducing the properties of the space into the header of the message simultaneously with introducing the management instruction.

7. A transmission method according to claim 1, further comprising the step of associating access authorization with at least one message.

8. A transmission method according to claim 7, wherein the access authorization allows the message to be read and to be replied to.

9. A transmission method according to claim 7, wherein the access authorization is restricted to reading the message.

10. A transmission method according to claim 7, further comprising the step of introducing the access authorization in the header of the message.

11. A transmission method according to claim 7, further comprising the step of introducing the access authorization amongst the properties of a filing space.

12. A transmission method according to claim 1, the method being implemented by means of a program installed in the first and second computers, the program enabling messages to be sent, messages to be received, and instructions contained in the headers of messages to be executed automatically on reception of the messages.

13. A transmission method according to claim 12, wherein the program operates using a protocol of the POP3/SMTP type.

14. A transmission method according to claim 12, wherein the program operates using a protocol of the IMAP4 type.

15. A transmission method according to claim 1, wherein the transmission information comprises at least an address of the second computer.

16. A transmission method according to claim 15, wherein the transmission information comprises at least the following information:

an identity of the first computer;

a time-and-date stamp;

the type of messaging program used by the first computer; and a subject matter of the message.

17. A transmission method according to claim 1, wherein the instruction to manage the filing space is an instruction for deleting access to the filing space in the second computer (1, 2, 3).

18. A transmission method according to claim 1, wherein the instruction to manage the filing space is an instruction for modifying the properties of a message filing space in the second computer (1, 2, 3).

19. A transmission method according to claim 1, wherein the instruction to manage the filing space is an instruction for deleting or modifying a message in the second computer (1, 2, 3), providing that the message came from the first computer (1, 2, 3).

20. A transmission method according to claim 1, further comprising the step of introducing into the header of the message at least one item of information for ordering the message relative to a message that appears at least in the second computer, and wherein the second computer incorporates means for reading said information automatically and for filing the message in corresponding manner in the second computer.

21. A method according to claim 1, further comprising, in the first computer (1, 2, 3) and prior to transmitting the message, the steps of introducing integrity information into the header (6) of the message (5) and of encoding at least said integrity information using an encryption algorithm, and in the second computer, the steps of decoding the integrity information, of verifying whether the integrity information is correct, and if not correct of ignoring the management instruction contained in the header of the message.

22. A transmission method according to claim 1, further comprising the step of introducing in the header of the message time-and-date stamp information expressed in terms of universal time.

* * * * *